(12) United States Patent
Liu et al.

(10) Patent No.: US 9,023,529 B2
(45) Date of Patent: May 5, 2015

(54) NANOMATERIALS FOR SODIUM-ION BATTERIES

(75) Inventors: Jun Liu, Richland, WA (US); Yuliang Cao, Wuhan (CN); Lifen Xiao, Wuhan (CN); Zhenguo Yang, Richland, WA (US); Wei Wang, Kennewick, WA (US); Daiwon Choi, Richland, WA (US); Zimin Nie, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 204 days.

(21) Appl. No.: 13/474,963

(22) Filed: May 18, 2012

(65) Prior Publication Data

US 2012/0295147 A1   Nov. 22, 2012

Related U.S. Application Data

(60) Provisional application No. 61/487,364, filed on May 18, 2011.

(51) Int. Cl.
| | |
|---|---|
| *H01M 4/50* | (2010.01) |
| *H01M 4/48* | (2010.01) |
| *H01M 14/00* | (2006.01) |
| *H01M 4/505* | (2010.01) |
| *H01M 4/131* | (2010.01) |
| *H01M 10/054* | (2010.01) |

(52) U.S. Cl.
CPC ............ *H01M 4/505* (2013.01); *Y10T 428/298* (2013.01); *H01M 14/00* (2013.01); *H01M 4/50* (2013.01); *H01M 4/131* (2013.01); *H01M 10/054* (2013.01); *Y02E 60/122* (2013.01)

(58) Field of Classification Search
CPC ........... H01M 4/02; H01M 4/04; H01M 4/50; H01M 4/505; H01M 14/00
USPC ................................ 429/122, 223, 221, 231.1
See application file for complete search history.

(56) References Cited

U.S. PATENT DOCUMENTS 6,399,247 B1 * 6/2002 Kitayama et al. ............. 429/223
2007/0218361 A1 * 9/2007 Inoue et al. ................ 429/231.1

FOREIGN PATENT DOCUMENTS

| JP | 2008226798 A | * | 9/2008 | ............. H01M 4/60 |
| JP | 2008285372 A | * | 11/2008 | ............. C03B 28/62 |

OTHER PUBLICATIONS

Machine Translation of: JP 2008/285372 A, Nov. 27, 2008.*
Machine Translation of: JP 2008/226798 A, Sep. 25, 2008.*
Li et al., "Formation of Na0.44MnO2 Nanowires via Stress-Induced Splitting of Birnessite Nanosheets", Nano Research, 2009, p. 54-60.*
International Search Report and Written Opinion for International Application No. PCT/US2012/038505, International Filing Date May 18, 2012, Date of Mailing Jan. 3, 2013.

(Continued)

*Primary Examiner* — Kenneth Douyette
(74) *Attorney, Agent, or Firm* — A. J. Gokcek

(57) ABSTRACT

A crystalline nanowire and method of making a crystalline nanowire are disclosed. The method includes dissolving a first nitrate salt and a second nitrate salt in an acrylic acid aqueous solution. An initiator is added to the solution, which is then heated to form polyacrylatyes. The polyacrylates are dried and calcined. The nanowires show high reversible capacity, enhanced cycleability, and promising rate capability for a battery or capacitor.

2 Claims, 14 Drawing Sheets

(56) References Cited

OTHER PUBLICATIONS

Communication Relating to the Results of the Partial International Search for International Application No. PCT/US2012/038505, International Filing Date May 18, 2012, Date of Mailing Sep. 19, 2012.
Whitacre, J. F., et al., Na4Mn9O18 as a positive electrode material for an aqueous electrolyte sodium-ion energy storage device, Electrochemistry Communications, 12, 2010, 463-466.
Yu, L., et al., Structgural and Electrochemical Characterization of Nanocrystalline Li[Li0.12Ni0,32Mn0.56]02 Synthesized by a Polymer-Pyrolysis Route, J. Phys. Chem. B., 109, 2005, 1148-1154.
Tarascon, J.-M., et al., Issues and challenges facing rechargeable lithium batteries, Nature, 414, 2001, 359-367.
Goodenough, J. B., et al., Challenges for Rechargeable Li Batteries, Chemistry of Materials Review, 22, 2010, 587-603.
Ellis, B. L., A multifunctional 3.5V iron-based phosphate cathode for rechargeable batteries, Nature Materials, 6, 2007, 749-753.
Stevens, D. A., et al., High Capacity Anode Materials for Rechargeable Sodium Ion Batteries, Journal of the Electrochemical Society, 147, 4, 2000, 1271-1273.
Sauvage, F., et al., Study of the Insertion/Deinsertion Mechanism of Sodium into Na0.44MnO2, Inorganic Chemistry, 46, 8, 2007, 3289-3294.
Recham, N., et al., Ionothermal Synthesis of Sodium-Based Fluorophosphate Cathode Materials, Journal of the Electrochemical Society, 156, 12, 2009, A993-A999.
Barker, J., et al., Synthesis and Electrochemical Insertion and Properties of the Layered Li x MoO2 Phases ?(?x?=0.74?, ? 0.86, and 1.00), Electrochemical Solid-State Letters, 6, 12, 2003, A252-A256.
Caballero, A., et al., Synthesis and characterization of high-temperature hexagonal P2—Na0.6 MnO2 and its electrochemical behavior as cathode in sodium cells, Journal of Materials Chemistry, 12, 2002, 1142-1147.
Doeff. M. M., et al., A High-Rate Manganese Oxide for Rechargeable Lithium Battery Applications, Journal of the Electrochemical Society, 148, 3, 2001, A230-A236.
Armstrong, A. R., et al., Synthesis of layered LiMnO2 as an electrode for rechargeable lithium batteries, Letters to Nature, 381, 1996, 499-500.
Kim, D., et al., Enabling Sodium Batteries Using Lithium-Substituted Sodium Layered Transition Metal Oxide Cathodes, Advanced Energy Materials, 1, 2011, 333-336.
Doeff, M. M., et al., Lithium Insertion Process of Orthohombic NaxMnO2-Based Electrode Materials, Journal of the Electrochemical Society, 143, 8, 1996, 2507.
Doeff, M. M., et al., Orthorhombic Na x MnO2 as a Cathode Material for Secondary Sodium and Lithium Polymer Batteries, Journal of the Electrochemical Society, 141, 11, 1994, L145-L147.
Doeff. M. M., et al., Electrochemical and structural characterization of titanium-substituted manganese oxides based on Na0.44MnO2, Journal of Power Sources, 135, 2004, 240-248.
Hosono, E., et al., Synthesis of single crystalline electro-conductive Na0.44MnO2 nanowires with high aspect ratio for the fast charge-discharge Li ion battery, Journal of Power Sources, 182, 2008, 349-352.
Yang, Y., et al., Single Nanorod Devices for Battery Diagnostics: A Case Study on LiMn2O4, Nano Letters, 9, 12, 2009, 4109-4114.
Meduri, P., et al., Hybrid Tin Oxide Nanowires as Stable and High Capacity Anodes for Li-Ion Battteries, Nano Letters, 9, 2, 2009, 612-616.
Kim, D. K., et al., Spinel LiMn2O4 Nanorods as Lithium Ion Battery Cathodes, Nano Letters, 8, 11, 2008, 3948-3952.
Hosono, E., et al., Synthesis of Single Crystalline Spinel Li8Mn2O4 Nanowires for a Lithium Ion Battery with High Power Density, Nano Letters, 9, 3, 2009, 1045-1051.
Cui, L.-F., et al., Carbon-Silicon Core-Shell Nanowires as High Capacity Electrode for Lithium Ion Batteries, Nano Letters, 9, 9, 2009, 3370-3374.
Yu, L, et al., Structural and Electrochemical Characterization of Nanocrystalline Li[Li0.12Ni0.32Mn0.56]O2 Synthesized by a Polymer-Pyrolysis Route, Journal of Physical Chemistry B, 109, 2005,m 1148-1154.
Chen, Z., et al., Preparation for electrochemical performance of Sn—Co—C composite as anode materials for Li-ion batteries, Journal of Power Sources, 189, 2009, 730-732.
Mumme, W. G., The Strucre of Na4Mn4Ti5O18, Acta Cryst., B24, 1968, 1114-1120.
Li, Y., et al., Formation of Na0.44MnO2 Nanowires via Stress-Induced Splitting of Birnessite Nanosheets, Nano Research, 2, 2009, 54-60.
Ho, C., et al., Application of A?C Techniques to the Study of Lithium Diffusion in Tungsten Trioxide Thin Films, Journal of the Electrochemical Society, 127, 2, 1980, 343-350.
Yamada, O., et al., Charge/discharge cycling and impedance response of LiMn2O4 electrode in organic electrolyte solutions with different compositions Electrichimica Acta, 45, 2000, 2197-2201.
Shaju, K. M., et al., EIS and GITT studies on oxide cathodes, 02-Li(2/3)+x(Co0.15Mn0.85)O2 (x=0 and 1/3), Electrochimica Acta, 48, 2003, 2691-2703.
Shaju, K. M., et al., Influence of Li-Ion Kinetics in the Cathodic Performance of Layered Li?(?Ni1?/?3Co1?/?3Mn/!/! 3?)??0?2, Journal of the Electrochemical Society, 151, 9, 2004, A1324-A1332.
Suib, L. S., Structure, porosity, and redox in porous manganese oxide octahedral layer and molecular sieve materials, Journal of Materials Chemistry, 18, 2008, 1623-1631.
Li, W.-N., et al., Hydrothermal Synthesis of Structure- and Shape-Controlled Manganese Oxide Octahedral Molecular Sieve Nanomaterials, Advanced Functional Materials, 16, 2006, 1247-1253.
Prosini, P. P., et al., Determination of the chemical diffusion coefficient of lithium in LiFePO4, Solid State Ionics, 148, 2002, 45-51.
Chung, S.-Y., et al., Electronically conductive phospho-olivines as lithium storage electrodes, Nature Materials, 1, 2002, 123-128.
Wang, Y., et al., The Design of a LiFePo4/Carbon Nanocomposite With a Core-Shell Structure and Its Synthesis by an in Situ Polymerization Restriction Method, Agnew. Chem. Int. Ed., 47, 2008, 7461-7465.
Qian, J., et al., Template-Free Hydrothermal Synthesis of Nanoembossed Mesoporous LiFePO4 Microspheres for High-Performance Lithium-Ion Batteries, Journal of Physical Chemistry C, 114, 2010, 3477-3482.
Blochl, P. E., Projector autmented-wave method, Physical Review B, 50, 24, 1994, 953-979.
Kresse, G. et al., Efficient iterative schemes for ab initio total-energy calculations using a plane-wave basis set, Physical Review B, 54, 16, 1996, 169-186.
Kresse, G., et al., Ab initio molecular dynamics for liquid metals, Physical Review B, 47, 1, 558-561, Jan. 1,1993.
Perdew, J. P., et al., Generalized Gradient Approximation Made Simple, Physical Review Letters, 77, 18, 1996, 3865-3868.
Dudarev, S. L., et al., Electron-energy-loss spectra and the structural stability of nickel oxide: An LSDA+U study, Physical Review B, 57, 3, 1505-1509, Jan. 15, 1998.
Tevar, A. D., et al., Relating Synthesis Conditions and Electrochemical Performance for the Sodium Intercalation Compound Na4Mn9O18 in Aqueous Electrolyte, Journal of the Electrochemical Society, 157, 7, 2010, A870-A875.

\* cited by examiner

| x (Na$_{0.66-x}$MnO2) | OCV (V) | D$_{Na}$ value (cm$^2$ s$^{-1}$) |
|---|---|---|
| 0.0763 | 2.505 | 8.67×10$^{-16}$ |
| 0.1526 | 2.7431 | 1.57×10$^{-15}$ |
| 0.2289 | 3.0481 | 3.04×10$^{-15}$ |
| 0.3052 | 3.2448 | 3.44×10$^{-15}$ |
| 0.3815 | 3.4655 | 5.51×10$^{-15}$ |
| 0.4101 | 3.5227 | 2.13×10$^{-16}$ |

Figure 7

| Calcining temperature | Unit cell parameters (Å) | | | Cell volume (Å$^3$) |
|---|---|---|---|---|
| | a | b | c | |
| 600 °C | 9.10281 | 26.44264 | 2.83849 | 683.27 |
| 750 °C | 9.08894 | 26.45045 | 2.83362 | 681.22 |
| 900 °C | 9.09814 | 26.39346 | 2.83325 | 680.35 |

Figure 8

NANOMATERIALS FOR SODIUM-ION BATTERIES

CROSS-REFERENCE TO RELATED APPLICATIONS

This application claims priority to U.S. Provisional Application Ser. No. 61/487,364, filed May 18, 2011, titled "NANOMATERIALS FOR SODIUM-ION BATTERIES", hereby incorporated by reference in its entirety for all of its teachings.

STATEMENT REGARDING FEDERALLY SPONSORED RESEARCH OR DEVELOPMENT

This invention was made with Government support under Contract DE-AC05-76RLO1830 awarded by the U.S. Department of Energy. The Government has certain rights in the invention.

TECHNICAL FIELD

This invention relates to crystalline nanomaterials. More specifically, this invention relates to crystalline nanomaterials made from nitrate salts.

BACKGROUND OF THE INVENTION

The emerging concerns over the depletion of the fossil fuel sources and the impact of greenhouse gas emission have created great demands for the development of large-scale energy storage systems for electric vehicles (EV) and renewable energy resources such as wind and solar. Lithium-ion batteries are considered as one of the most attractive technologies for rechargeable energy storage for electrical vehicles due to their high energy density and long service life. However, there is still great concern about the cost of Li-ion batteries and the potential limit of Li supplies available in terrestrial reserves, especially for the large-scale energy storage applications for renewable energy and grid. Therefore, alternative energy storage mechanisms and devices using abundant and environmentally friendly materials are highly desirable.

Sodium-ion batteries have been discussed in the literature for some time. A battery that uses sodium ions instead of lithium ions is attractive because it could be potentially much cheaper and safer, and it is more environmentally benign. A sodium ion storage mechanism is also scientifically interesting and challenging because sodium ions are about 70% larger in radius than that of lithium ions. This makes it difficult to find a suitable host material to accommodate the sodium ions and allow reversible and rapid ion insertion/extraction.

In the literature, hard carbon based negative electrodes have been reported to deliver a capacity of 300 mAh g$^{-1}$ through Na ion insertion/deinsertion reaction. However, few studies have been reported for the Na-ion battery cathode materials with decent performance. For example, fluorophosphates materials were developed as a cathode material for Na-ion battery. Barke et al. studied a hard carbon/NaVPO$_4$F battery demonstrating a specific capacity of 79 mAh g$^{-1}$ from NaVPO$_4$F based in the initial cycle, but less than 50% of the original capacity after 30 cycles. Most of the research on cathode materials for rechargeable sodium batteries has been focused on the manganese oxides because of their large-size tunnels for Na ion insertion and deinsertion. Morales et al. reported that layered P2-Na$_{0.6}$MnO$_2$ can deliver 150 mAh g$^{-1}$ first cycle capacity, but this material exhibited a poor capacity retention capability with more than 50% of capacity loss after only ten cycles. For most layered and tunnel-type manganese oxides, the main cause of the structural instability during repetitive cycling is the inability to accommodate the Jahn-Teller distortion following the reduction of Mn(IV) to Mn(III) within the rigid close packed oxide ion structures. A similar fading mechanism has been identified for the capacity degradation of the layered LiMnO$_2$ and spinel LiMn$_2$O$_4$. A recent study by Kim and Johnson reported that a layered Na—Ni—Mn oxide with Li doping exhibited a capacity of about 95 mAhg-1 with good capacity retention over 50 charge-discharge cycles. However, this kind of material still needs 20% molar ratio Li to stabilize the structure during cycling. A Li-free cathode material, with a much higher capacity and much longer cycle life is desired.

Recently, MnO$_6$ octahedra and MnO$_5$ square pyramids are found to form large, double ion channels in orthorhombic Na$_4$Mn$_9$O$_{18}$ (Na$_{0.44}$MnO$_2$) and offer better cycling stability due to the ability to tolerate some stress during structural changes, as shown in FIG. 1A. There have been numerous studies on the structures and electrochemical properties of such materials, but the insertion/deinsertion behavior of sodium ions has not been well studied. Sauvage et al. have shown reversible insertion and deinsertion of sodium ion in pure Na$_4$Mn$_9$O$_{18}$ prepared with an initial capacity of about 80 mAh/g at a C/10 rate, but the cycling capacity faded rapidly with cycling and only half of the initial capacity was retained after 50 cycles. Compared with lithium-ion, the inferior sodium inserting/deinserting performance is mainly due to the failure of these Na$_4$Mn$_9$O$_{18}$ to accommodate the structural change during the insertion/extraction of large sodium ions, leading to slow kinetics and structure degradation.

SUMMARY OF THE INVENTION

The present invention is directed to a crystalline nanomaterial and a method of making a crystalline nanomaterial. In one embodiment of the present invention, a method of making a crystalline nanomaterial is disclosed. The method comprises dissolving a first nitrate salt and a second nitrate in an acrylic acid aqueous solution; and adding an initiator to the acrylic acid solution. The method further comprises heating the solution to form polyacrylates; drying the polyacrylates and calcining the polyacrylates.

In one embodiment, the first nitrate salt is sodium nitrate and the second nitrate salt is manganese nitrate, and the polyacrylates are polyacrylates of sodium and manganese. In one embodiment, the initiator is ammonium persulfate.

In one embodiment, the solution is heated at a temperature in the range of 60° C. to 100° C. In one embodiment, the polyacrylates are dried at a temperature in the range of 90° C. to 150° C., and calcined at a temperature in the range of 500° C. to 900° C.

In one embodiment, the crystalline nanomaterial forms an electrode. The electrode can be a cathode.

In another embodiment of the present invention, a method of making a crystalline nanomaterial is disclosed. The method comprises dissolving a stoichiometric amount of sodium nitrate and manganese nitrate in an acrylic acid aqueous solution, and adding an initiator to the acrylic acid solution. The method further comprises heating the solution to form polyacrylates of sodium and manganese; drying the polyacrylates; and calcining the polyacrylates. The initiator can be ammonium persulfate.

In another embodiment of the present invention, a crystalline nanomaterial is disclosed. The nanomaterial comprises sodium nitrate, manganese nitrate, acrylic acid aqueous solution, and an initiator. The nitrates are dissolved in the solution, and the initiator is added to the solution. In one embodiment, the molar ratio of sodium nitrate, manganese nitrate, and acrylic acid ranges from 0.1:1.5:2.5 to 1:2.5:3.5.

In another embodiment of the present invention, a device in which energy is stored is disclosed. The device comprises a crystalline nanowire represented by the formula $Na_xA_yMn B_zO_nC_a$. A represents H, Li, Be, Mg, K, Ca, Rb, Sr, Cs, Ba, Fr, Ra or combinations thereof. B represents V, Cr, Mo, Tc, Fe, Ru or combinations thereof. C represents N, P, S, F, Cl or combinations thereof. The device has an electrode capacity of at least 80 mAh/g. The device has an energy density of at least 800 kWh/kg. The device exhibits less than about 30% degradation after about 100 to about 2000 charge/discharge cycles. The device includes a single crystalline nanowire with a diameter of less than about 70 nm.

In another embodiment of the present, a device in which energy is stored is disclosed. The device comprises a crystalline nanowire represented by the formula $Na_xMnO_y$. The device has an electrode capacity of at least 80 mAh/g. The device has an energy density of at least 800 kWh/kg. The device exhibits less than about 30% degradation after about 100 to about 2000 charge/discharge cycles, and the device includes a single crystalline nanowire with a diameter of less than about 70 nm.

BRIEF DESCRIPTION OF THE DRAWINGS

FIG. 7 shows diffusion coefficients of sodium ion of $Na_4Mn_9O_{18}$ nanowires calcined at 750° C. for different open circuit voltage (OCV) values.

FIG. 8 shows structural parameters and calcining temperatures of $Na_4Mn_9O_{18}$ phases (space group: Pham) from Rietveld refinements.

DETAILED DESCRIPTION OF THE PREFERRED EMBODIMENTS

Figure 1A:
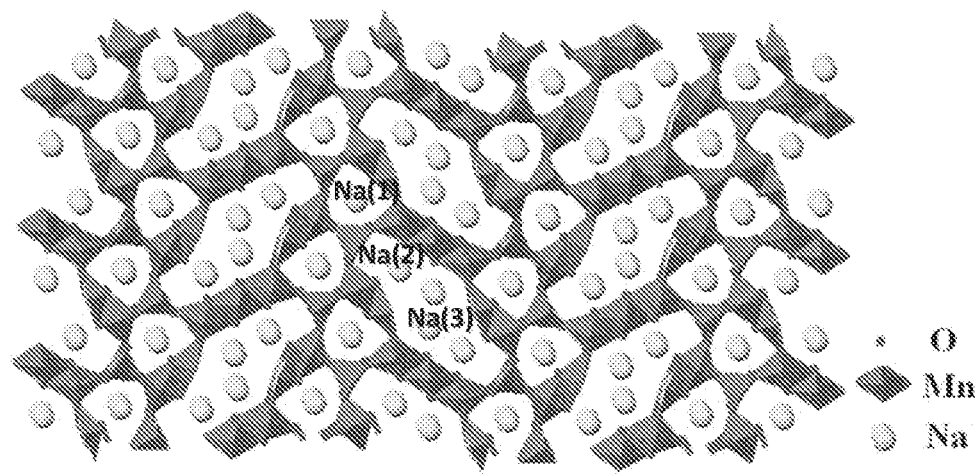
FIG. 1A shows the basic structure of orthorhombic $Na_4Mn_9O_{18}$.

Various advantages and novel features of the present invention are described herein and will become further readily apparent to those skilled in this art from the following detailed description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the preferred embodiments set forth hereafter are to be regarded as illustrative in nature, and not as restrictive.

The following description includes the preferred best mode of one embodiment of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

Nanomaterials and nanotechnology have offered new opportunities to fine tune the structure and properties for energy application. In particular nanorods and nanowires have shown promising results to improve the capacity and stability for lithium ion batteries due to their short ion diffusion distance, good conductivity and excellent stress tolerance. Disclosed are new materials to make nanowires and nanowires made from nitrate salts.

In one embodiment, a nanomaterial is disclosed that includes sodium and manganese. In one particular embodiment, a single crystalline $Na_4Mn_9O_{18}$ nanowire with high reversible capacity and exceptional cycling performance for sodium-ion battery is disclosed. The $Na_4Mn_9O_{18}$ nanowire electrode material calcined at approximately 750° C. delivers a reversible capacity of 128 mAh g$^{-1}$ at 0.1 C with an excellent capacity retention capability of about 77% initial capacity retention even after 1000 cycles at 0.5° C.

In one embodiment, a method of making a crystalline nanomaterial is disclosed. The method includes dissolving a first nitrate salt and a second nitrate salt in an acrylic acid aqueous solution. The method also includes adding an initiator, such as ammonium persulfate, to the acrylic acid solution. The method further includes heating the solution to form polyacrylates. The method also includes drying and calcining the polyacrylates.

Experimental Section

The following examples serve to illustrate exemplary embodiments and aspects of the present invention and not to be construed as limiting the scope thereof.

Material Preparation

Single crystalline $Na_4Mn_9O_{18}$ nanowires were synthesized by a polymer-pyrolysis method. In a typical experiment, the precursor was prepared by first dissolving stoichiometric $NaNO_3$ and $Mn(NO_3)_2$ respectively in acrylic acid, and then acrylic acid was polymerized with the precursor solution at 80° C., followed by drying in air at 120° C. for 24 h. The obtained copolymeric precursor was finally calcined at 450, 600, 750 and 900° C. for 24 hours in air, respectively.

In particular, single crystalline $Na_4Mn_9O_{18}$ nanowires were prepared by a polymer-pyrolysis method using polyacrylates of Na and Mn as precursor compounds. The copolymeric precursor was made from the solution polymerization of $NaNO_3$ (≥99.0%, Sigma-Aldrich), $Mn(NO_3)_2$ (hydrate, 98%, Aldrich) and acrylate acid (99%, Aldrich) with 0.5:1:2.5 molar ratio using $(NH_4)_2S_2O_8$ as initiator. The typical experimental procedure is first to dissolve a stoichiometric amount of $NaNO_3$ and $Mn(NO_3)_2$ in acrylate acid solution under stirring. The acrylate acid solution was prepared by mixing acrylate acid with distilled water with 70:30 mass ratios. Then small amounts of 5% $(NH_4)_2S_2O_8$ aqueous solution as initiator was added to the mixed acrylate acid solution to promote the polymerization. Under heating at ~80° C. for several hours, the mixing solution changed solid and to finally form polyacrylates of Na and Mn. The resulting polyacrylates were dried at 120° C. for 24 h. The obtained copolymeric precursor was then finally calcined at 600, 750 and 900° C. for 24 hours in air, respectively.

Structural Characterization

SEM, TEM and HRTEM experiments were performed on an FEI Helios Nanolab dual-beam focused ion beam/scanning electron microscope (FIB/SEM) and JEOL-2010 high-resolution electron microscope, respectively. XRD measurements were carried out on a Philips Xpert X-ray diffractometer using Cu Kα radiation at λ=1.54 Å. Nitrogen adsorption-desorption isotherms for surface-area and pore analysis were measured with a Quantachrome Autosorb Automated Gas Sorption System.

Electrochemical Characterization

The $Na_4Mn_9O_{18}$ cathode was prepared by mixing 80 wt. % $Na_4Mn_9O_{18}$ powder, 10 wt. % Super-P carbon black, 10 wt. % polyvinylidene difluoride (PVDF) dissolved in N-methyl-2-pyrrolidone (NMP) to form slurry, then pasting the electrode slurry on Al foil. Electrochemical tests of the electrode materials were performed using coin cells with the $Na_4Mn_9O_{18}$ cathode and sodium metal as counter and reference electrode. The electrolyte was 1M $NaClO_4$ dissolved in a mixture of ethylene carbonate (EC) and dimethyl carbonate (DMC) (1:2 by wt.) and the separator was a microporous membrane (Celgard 2400). The cells were assembled in an argon-filled glove box. The galvanostatic charge-discharge test was conducted at a voltage interval of 0.01~1.5 V by a BT-2043 Arbin Battery Testing System. Cyclic voltammetric measurements were also carried out with the coin cell at the scan rate of 0.1 mV s$^{-1}$ by using SI 1287 electrochemical interface (Solartron). To obtain the diffusion coefficient of sodium ion within $Na_4Mn_9O_{18}$ cathode, electrochemical impedance spectroscopy (EIS) measurements were carried out using a frequency response analyzer (Solartron, SI 1260) in the frequency range 100 KHZ to 3 mHZ with an ac signal amplitude of 10 mV. The cell was charged at 20 mA g$^{-1}$ and the current flux was stopped after an interval of 1 h. After the cell relaxed to its open circuit potential (OCV) for 3 h, impedance response was measured.

First-Principle Calculations and Discussion

Figure 11A:
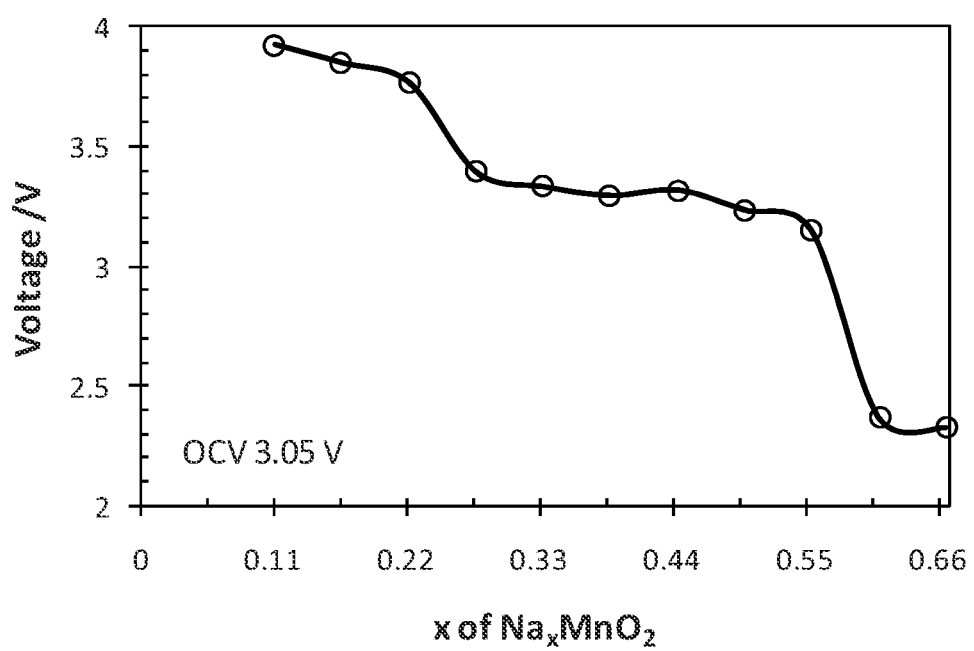
FIG. 11 shows (A) the average potential of $Na_4Mn_9O_{18}$ calculated by using GGA+U functional. Na was added orderly as marked starting from $Mn_{18}O_{36}$ to $Na_{12}Mn_{18}O_{36}$; (B) structure of $Na_4Mn_9O_{18}$ for first-principle calculations.
Figure 11B:
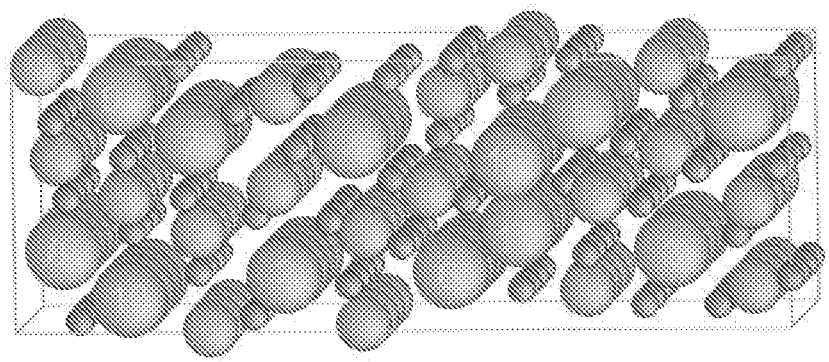

The quantum mechanical calculations based on the density functional theory (DFT) formalism were carried out using using the projector-augmented-wave (PAW)[16] method as implemented in the ab initio total-energy and dynamics program VASP (Vienna ab initio simulation Program)[17]. The standard library potentials 'Na', 'O' and 'Mn' were used. To take into account the localized 3d orbital dependence of the Coulomb and exchange interactions, the generalized gradient approximation[18] (GGA)+U, which is aligned with the LDA+U formalism proposed by Dudarev et al.,[19] was used for evaluating the exchange-correlation energy. Within this formalism, a value of $U_{eff}$=4.0 eV for Mn was used for all studied compounds. In conjunction, a plane-wave cut-off energy of 500 eV was used for all calculations. Gaussian smearing was used with a smearing parameter of 0.20 eV. All atoms and cell parameters of each structure were fully relaxed until the Hellmann-Feynman forces on each ion were negligible (<0.001 eV/Å). 13 supercells were generated by constructing a 1 conventional unit cell, containing 54-atoms and 66-atoms for $MnO_2$ and $Na_6Mn_9O_{18}$, respectively, as shown in FIG. 11B. Brillouin-zone integration was performed using the Monkhorst-Pack grid, and employed 2×1×8 meshes for all structures. All calculations are performed with spin polarization to reproduce each structure with the ferromagnetic ground state for phases. FIG. 11 shows (a) the average potential of $Na_4Mn_9O_{18}$ calculated by using GGA+U functional. Na was added orderly as marked starting from $Mn_{18}O_{36}$ to $Na_{12}Mn_{18}O_{36}$. FIG. 8 shows structural parameters and calcining temperatures of $Na_4Mn_9O_{18}$ phases (space group: Pbam) from Rietveld refinements.

Figure 1B:
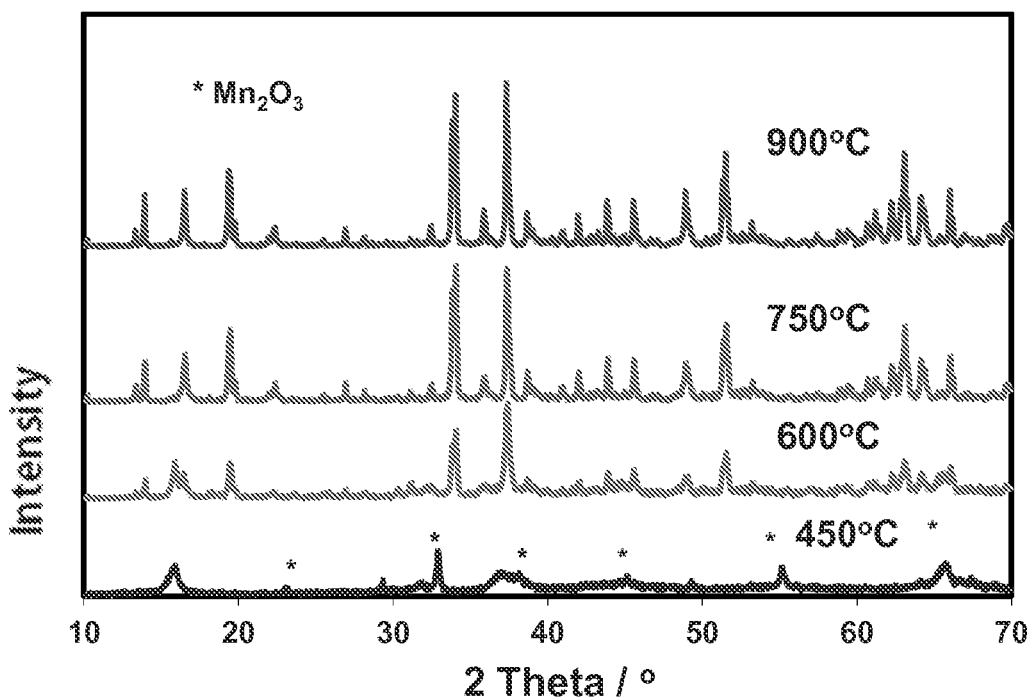
FIG. 1B shows XRD patterns of $Na_4Mn_9O_{18}$ calcined at different temperatures.

$Na_4Mn_9O_{18}$ is isostructural with $Na_4Mn_4Ti_5O_{18}$ and has an orthorhombic lattice structure (Pbam space group, JCPDS No. 27-0750). The basic structure unit is made up of $MnO_5$ square pyramids and $MnO_6$ octahedra, which are arranged to form two types of tunnels: large S-shaped tunnels and smaller pentagon tunnels, as shown in FIG. 1A. In this structure, three sodium sites exist: fully filled occupation by Na (1) in the small tunnels and half-filled occupation by Na(2) and Na(3) in the large S-shaped tunnels. Sodium ions in the large S-shaped tunnels are considered to be mobile and can be potentially reversibly extracted, while the sodium ions in the small tunnels are fixed and cannot be extracted. The sodium ions in the large channels would produce a theoretical discharge capacity of 160 mAh/g. X-ray diffraction (XRD) patterns, as shown in FIG. 1B, which confirms that the materials prepared by the polymer-pyrolysis method crystallize as the orthorhombic $Na_4Mn_9O_{18}$ phase (JCPDS No. 27-0750) with heat treatment to 600-900° C. No impurity peaks were detected in all the XRD patterns, even for the sample with low temperature treatment (600° C.). The intensity and width of XRD peaks become stronger and sharper with increasing treatment temperature, corresponding to better crystallinity and a larger crystallite size.

Figure 2A:
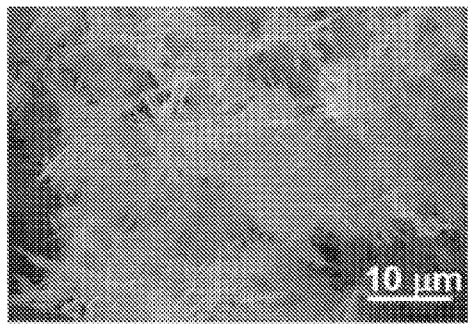
FIG. 2 shows SEM images of $Na_4Mn_9O_{18}$ calcined at different temperatures: (A) 750° C.; (B) 450° C.; (C) 600° C.; and (D) 900° C.
Figure 2B:
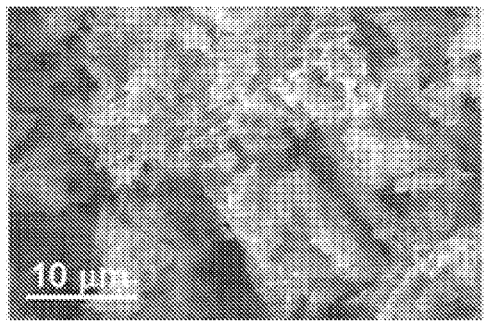
Figure 2C:
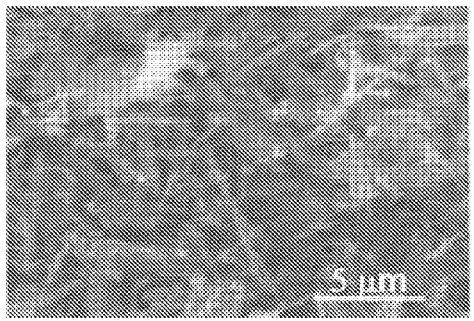
Figure 2D:
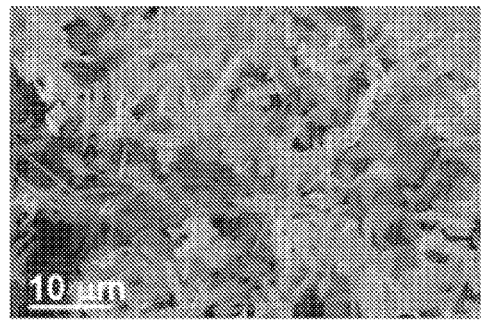
Figure 3A:
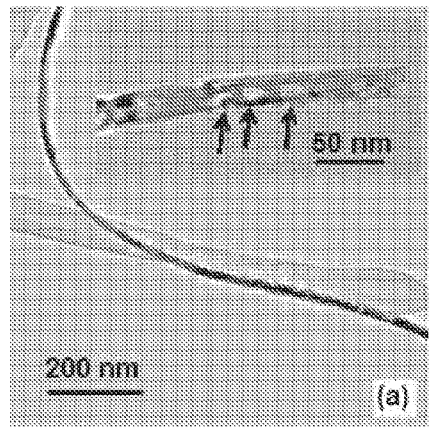
FIG. 3 shows TEM images of $Na_4Mn_9O_{18}$ nanowires: (A,B) calcined at 600° C.; (C) dispersing $Na_4Mn_9O_{18}$ (inset is image of a single nanowire); (D) incorporated $Na_4Mn_9O_{18}$ nanowires (inset of SADP); (E) expanded image of a single nanowire; and (F) high-resolution image of $Na_4Mn_9O_{18}$ nanowire.
Figure 3B:
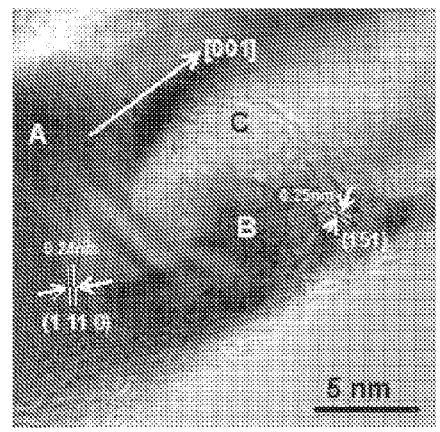
Figure 3C:
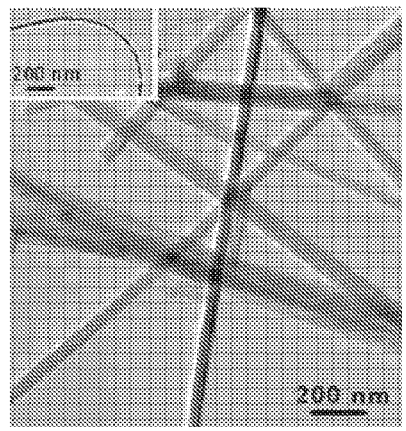
Figure 3D:
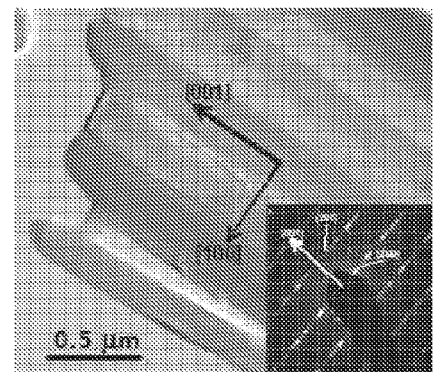
Figure 3E:
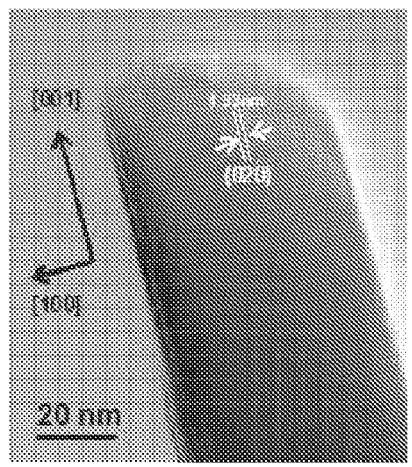
Figure 3F:
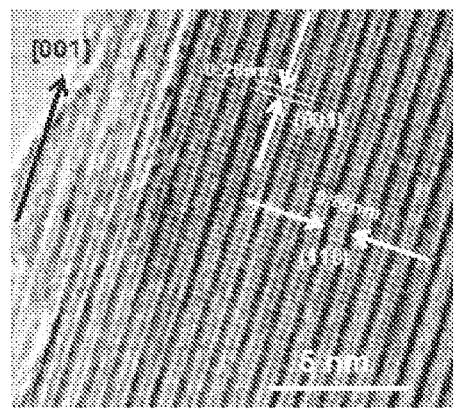

The morphologies of the as-prepared $Na_4Mn_9O_{18}$ materials were characterized by scanning electron microscopy (SEM) and transmission electron microscopy (TEM). FIG. 2 shows SEM images of $Na_4Mn_9O_{18}$ sintered at 450, 600, 750 and 900° C., respectively. At 750° C., mostly well-defined, crystalline nanowires and nanorods are observed, as shown in FIG. 2A. At 450° C., the materials appear to be quite disordered and have poorly defined, flake-like morphologies, as shown in FIG. 2B, indicating poor crystallization of $Na_4Mn_9O_{18}$ at low temperatures. Some nanowires and nanorod structure begin to appear at 600° C., as shown in FIG. 2C, although plate-like features are still quite visible. 750° C. produces the best nanowire/nanorod morphologies. At a much higher temperature, sintering takes place and the nanowires fused into short plate-like structures, as shown in FIG. 2D. A TEM image of the $Na_4Mn_9O_{18}$ sample treated at 600° C. displays some thin nanowires morphologies, as shown in FIG. 3A, but many cavities are observed inside the nanowires, as in FIG. 2A, indicating incomplete crystallization and high density of defects. The high-resolution TEM image in FIG. 3B shows the crystalline phase (A and B regions) as well as the cavities (C region). The lattice planes can be identified as the (151) and (1 11 0) plane as labeled in FIG. 3B, and the nanowire growth direction is [001] orientation. TEM image of the $Na_4Mn_9O_{18}$ sample treated at 750° C. shows quite uniform nanowire with ~50 nm in diameter and high crystallinity, as shown in FIGS. 3C, 3E, and 3F. It is worth noting the presence of residual nanosheets consisting of parallel nanowires, as shown in FIG. 3D. This result suggests a possible pathway to form a flake-like of sheet-like structure at a low temperature, as shown in FIG. 2B. At a higher temperature, nanowires further crystallize and split from the nanosheets. Selected area electron diffraction (SAED), as shown in FIG. 3D, revealed that the nanowires were a single-crystalline structure with orientation along [001] direction. Lattice fringe of the layer distance of the nanowire in the enlarged pictures of FIG. 3E was ~1.33 nm, corresponding to the interplanar distance of (020) plane. The good crystalline structure is also confirmed by the high-resolution TEM image of FIG. 3F that exhibits two perpendicular, (001) and (110) lattice planes. The BET surface area of the $Na_4Mn_9O_{18}$ nanowires was measured to be 17.8 $m^2 g^{-1}$ thorough $N_2$ adsorption/desorption measurements. Based on the average diameter (~50 nm) observed from TEM images and the density of $Na_4Mn_9O_{18}$ (4.25 $g\ cm^{-3}$), the surface area of the $Na_4Mn_9O_{18}$ nanowires calculated is about 18.8 $m^2 g^{-1}$, in a good agreement with the BET result.

Figure 12A:
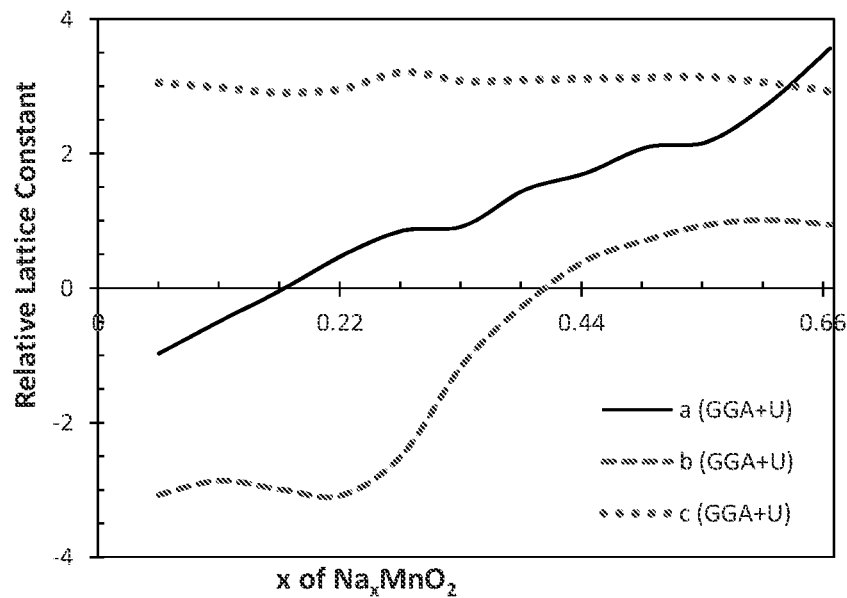
FIG. 12 shows the changes of relative lattice constants (a, b and c axis) and (A) relative volume; and (B) calculated by using GGA+U functional from $Na_{0.22}MnO_2$ to $Na_{0.66}MnO_2$.
Figure 12B:
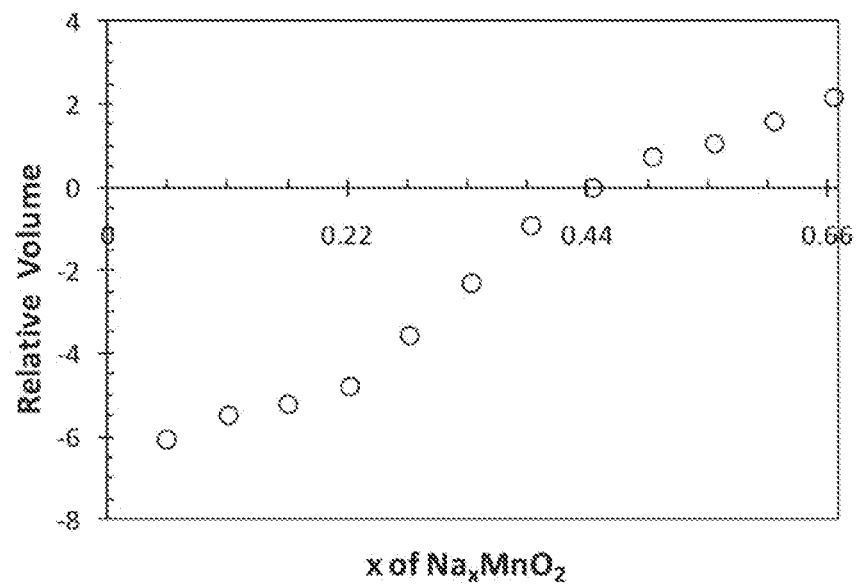

FIG. 12 shows the changes of relative lattice constants (a, b and c axis) and (A) relative volume; and (B) calculated by using GGA+U functional from $Na_{0.22}MnO_2$ to $Na_{0.66}MnO_2$.

Figure 4A:
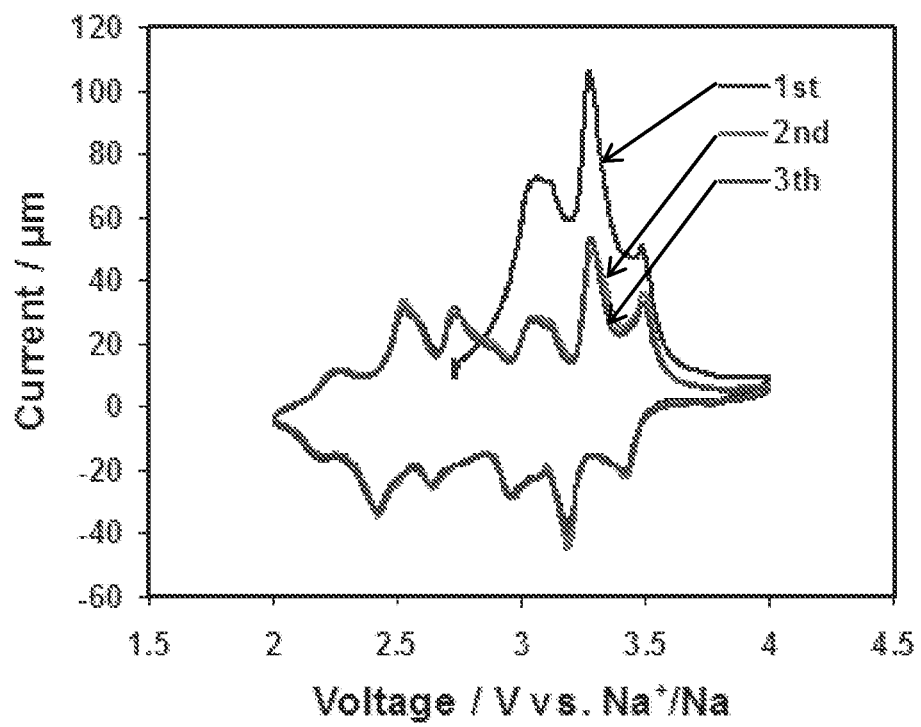
FIG. 4 shows electrochemical characterization and battery performance of samples of (A) CV curves of $Na_4Mn_9O_{18}$ nanowires calcined at 750 C between 2.0 and 4.0 V at potential sweep rate of 0.1 mv s$^{-1}$; (B) typical charge/discharge profile of $Na_4Mn_9O_{18}$ samples calcined at 600° C., 750° C. and 900° C. between 2.0 and 4.0 V at a current density of 12 mA g$^{-1}$ (0.1 C); (C) cycle performance of $Na_4Mn_9O_{18}$ samples calcined at 600° C., 750° C. and 900° C. at a current density of 60 mA g$^{-1}$ (0.5 C); (D) discharge capacity of $Na_4Mn_9O_{18}$ nanowires calcined at 750° C. as a function of charge/discharge cycles at different charge/discharge current densities of 12 (0.1 C), 24 (0.2 C), 60 (0.5 C), 120 (1 C) and 240 mA g$^{-1}$ (2 C), respectively.
Figure 4B:
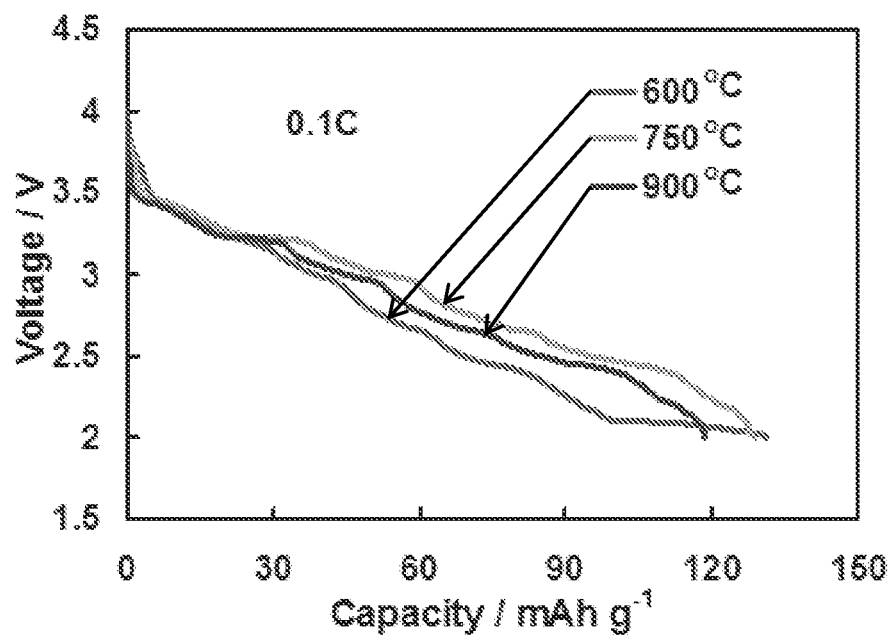

Sodium ion insertion/deinsertion properties of the $Na_4Mn_9O_{18}$ treated at different temperatures were investigated by cyclic voltammetry (CV) and galvanostatic charge-discharge cycling. FIG. 4A shows the typical CV curves of a nanowire $Na_4Mn_9O_{18}$ electrode treated at 750° C. cycled in 1 M $NaClO_4$ EC/DMC electrolyte at a scan rate of 0.1 $mV\ s^{-1}$. The oxidation process of first cycle is different from the subsequent cycles. The three oxidation peaks in the initial anodic scan are stronger than those in the subsequent scans, indicating some degree of irreversible reactions. The initial irreversible phenomenon likely originates from the initial multi-transition processes to accommodate the structural strain for sodium ion insertion and deinsertion. After the first scan, the subsequent CV curves have at least six pairs of quite symmetrical redox peaks, implying a complex multiphase transition mechanism during sodium ion insertion and deinsertion process.[4a] However, in situ XRD measurements studied by Sauvage F. et. al suggested that it is difficult to distinguish the appearance of a new phase during sodium ion insertion and deinsertion with only the shifts and splitting of few peaks observed, suggesting the phase structures during biphasic transitions are very close. The initial discharge profiles for the $Na_4Mn_9O_{18}$ treated at different temperatures were tested in the potential range of 2~4 V (vs $Na^+$/Na) at a constant current of 12 $mA\ g^{-1}$ (0.1 C), shown in FIG. 4B. The $Na_4Mn_9O_{18}$ nanowire electrode calcined at 600, 750 and 900° C. delivered a reversible discharge capacity of 130, 128 and 118 $mA\ h\ g^{-1}$, respectively. With increasing temperature, the discharge capacity of the $Na_4Mn_9O_{18}$ electrode decreases slightly.

Figure 4C:
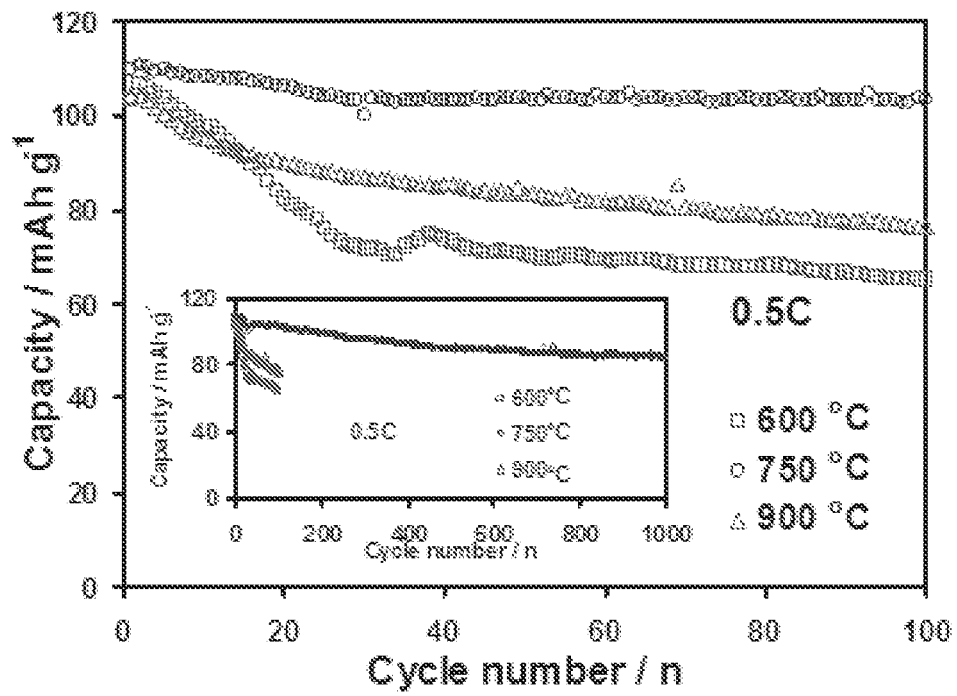
Figure 13:
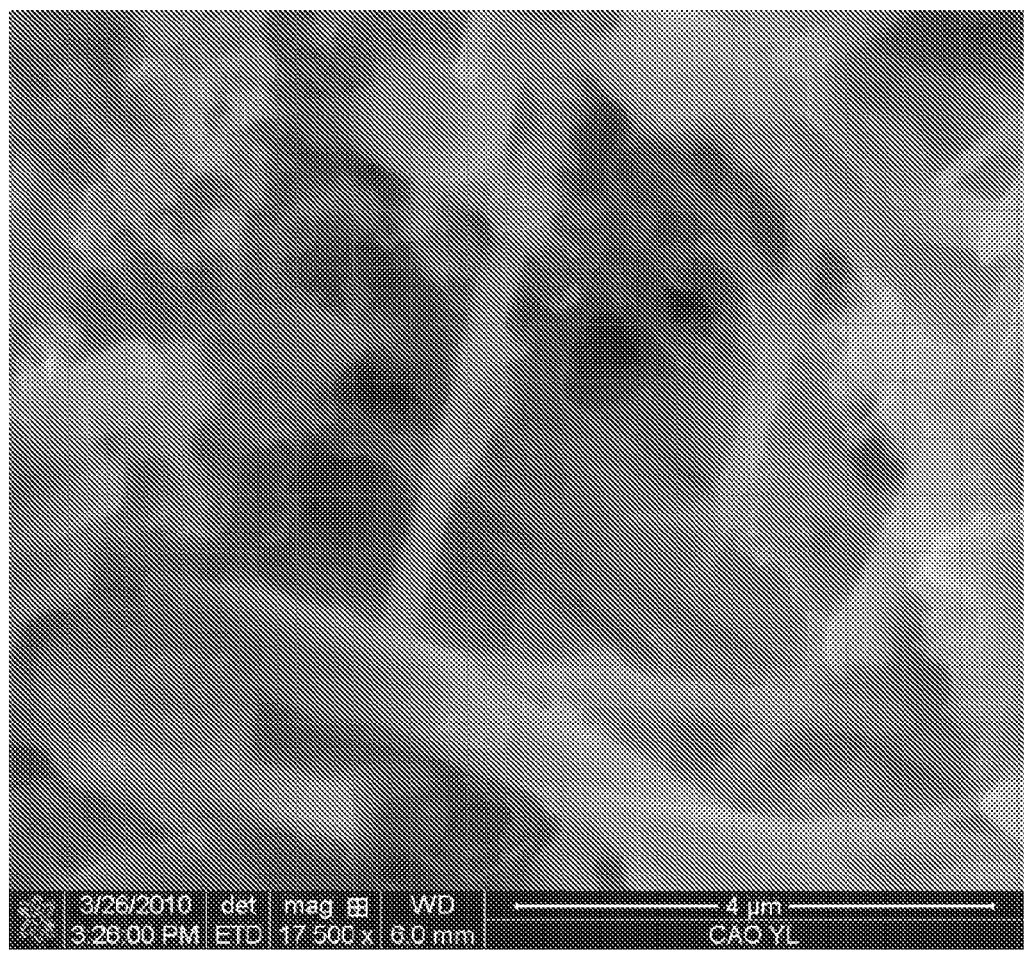
FIG. 13 shows a SEM image of $Na_4Mn_9O_{18}$ calcined at 750° C. after 100 cycles.

At 0.5 C, however, the $Na_4Mn_9O_{18}$ samples treated at different temperatures also exhibit different cycling performance, as shown in FIG. 4C. The $Na_4Mn_9O_{18}$ sample treated at 600 and 900° C. can only deliver 63.1% and 73.2% of initial capacity after 100 cycles. In comparison, for the 750° C. nanowires, there is only a slight decrease of capacity after 30 cycles (less than 7%). The capacity loss after 30 cycles is very slow and almost un-noticeable for the plot for up to 100 cycles. Even after 1000 cycles, the 750° C.-synthesized nanowires still have a discharge capacity of 84.2 $mAh\ g^{-1}$, corresponding to a 77% capacity retention! To the best of our knowledge, this material exhibits by far the best performance in terms of high capacity and excellent cycling stability for sodium ion insertion. FIG. 13 shows a SEM image of $Na_4Mn_9O_{18}$ calcined at 750° C. after 100 cycles.

The dependence of the capacity and stability on calcinations temperature is related to the crystallinity and the sizes of the nanowires. According to the XRD result and the morphology, shown in FIGS. 1 and 3, the excellent cycling performance of the $Na_4Mn_9O_{18}$ nanowires synthesized at approximately 750° C. is possibly a result of the formation of good crystalline structure and suitable particle size leading to reversible phase transition and effective accommodation of the structure strain during sodium ion insertion and deinsertion. At a lower temperature, a high initial capacity is obtained due to the existence of more accessible sites in the defected crystalline structure, as shown in FIG. 3A and FIG. 3B, but such disordered structures are also less stable in cycling. At a much higher temperature, significant crystal growth takes place (supporting information), and the large crystals produce more stress during Na ion insertion/extraction.

Figure 9:
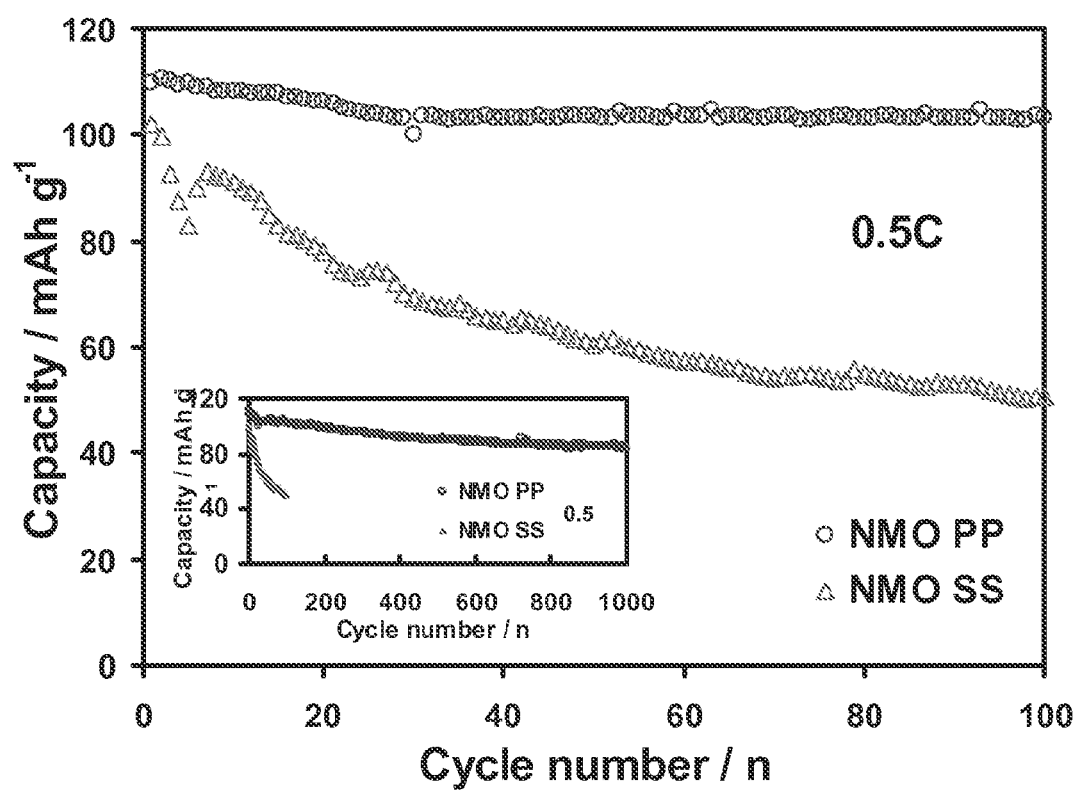
FIG. 9 shows cycle performance of the $Na_4Mn_9O_{18}$ cathode samples prepared by the polymer-pyrolysis method (PP) and solid-state reaction method (SS) at a current density of 60 mA g$^{-1}$ (0.5 C).

The polymer-pyrolysis method provides a precursor solution with homogeneous distribution of the constituents at the atomic level. The metal ions have strong binding to the carboxylate groups on the polymeric chains. This uniform immobilization of metallic ions in the polymer chains favors the formation of a uniformly distributed solid solution of the metallic oxides in the following pyrolysis process, facilitating the growth of high quality nanowires. To compare the polymer-pyrolysis method with the solid-state reaction method, we have prepared the $Na_4Mn_9O_{18}$ by the solid-state reaction method, as previously reported. As can be seen from FIG. 9, the cycling stability of the single crystalline $Na_4Mn_9O_{18}$ nanowire by the polymer-pyrolysis method is much better than that by the solid-state reaction method.

Figure 4D:
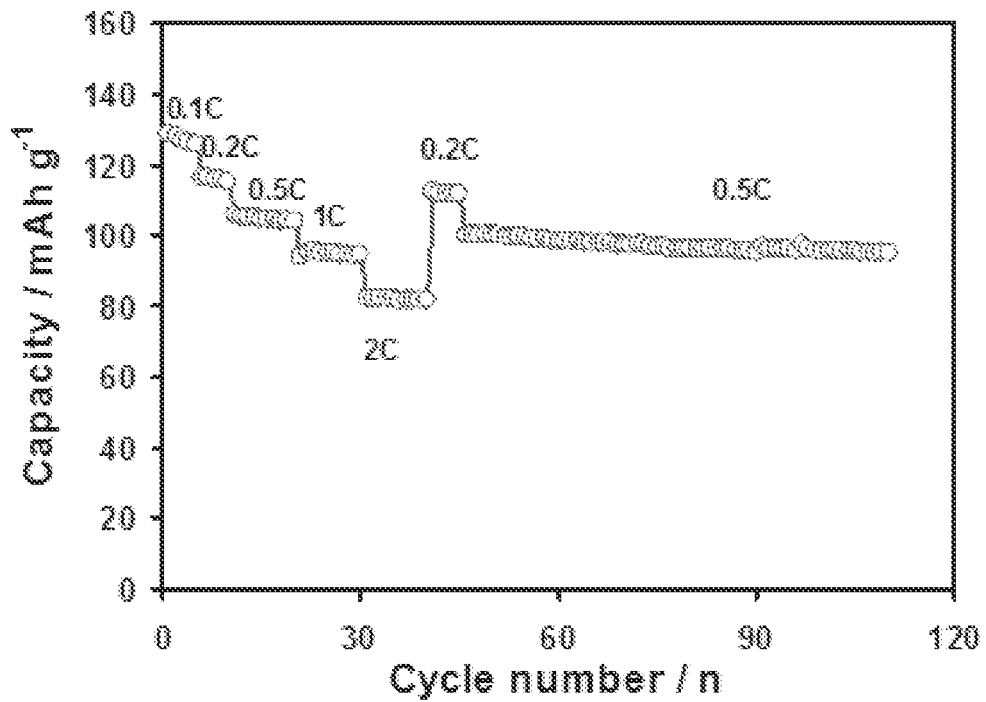

The nanowire $Na_4Mn_9O_{18}$ electrode has demonstrated not only high reversible capacity and excellent cycling stability, but also good rate capability as shown in FIG. 4D. The electrode delivers reversible capacity of 128 $mA\ h\ g^{-1}$ at 0.1 C, 94 $mA\ h\ g^{-1}$ at 1 C and 82 $mA\ h\ g^{-1}$ even at 2 C. The reversible capacity of the nanowire $Na_4Mn_9O_{18}$ electrode at 0.1 C is actually higher than the theoretical capacity of $Na_4Mn_9O_{18}$ with 4 Na ion insertion/extraction reaction from $Na_6Mn_9O_{18}$ to $Na_2Mn_9O_{18}$, implying that some Na (1) ions occupying the small tunnels in FIG. 1A could also be extracted to some extent to contribute to reversible capacity, in agreement with the previous report. Sauvage F. et al. reported that the $Na_4Mn_9O_{18}$ electrode capacity decreases drastically when the charge-discharge current is increased to larger than C/20, as a result of the sluggish kinetics involving the phase transition, sodium ion diffusion in solid state and structural reformation. Benefiting from the high crystallinity and nanowire morphology, the as-prepared $Na_4Mn_9O_{18}$ nanowires, however, demonstrate a much improved facile kinetic characteristics.

Figure 5A:
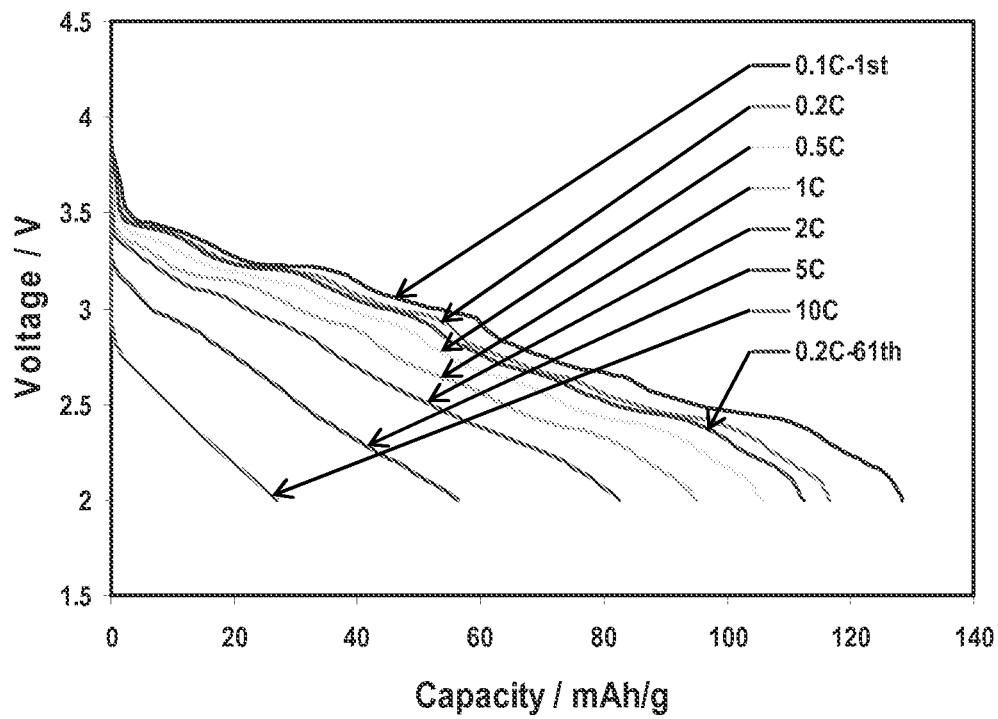
FIG. 5 shows graphs of (A) typical discharge curves of $Na_4Mn_9O_{18}$ nanowires calcined at 750° C. as a function of charge/discharge cycles at different charge/discharge current densities of 12 mA g-1 (0.1 C), 24 mA g-1 (0.2 C), 60 mA g-1 (0.5 C), 120 mA g-1 (1c), 120 mA g-1 (1 C), 600 mA g-1 (5 C) and 1200 mA g-1 (10 C), respectively; and (B) Log D vs. E plot for $Na_4Mn_9O_{18}$ nanowires calcined at 750 C obtained by EIS.
Figure 5B:
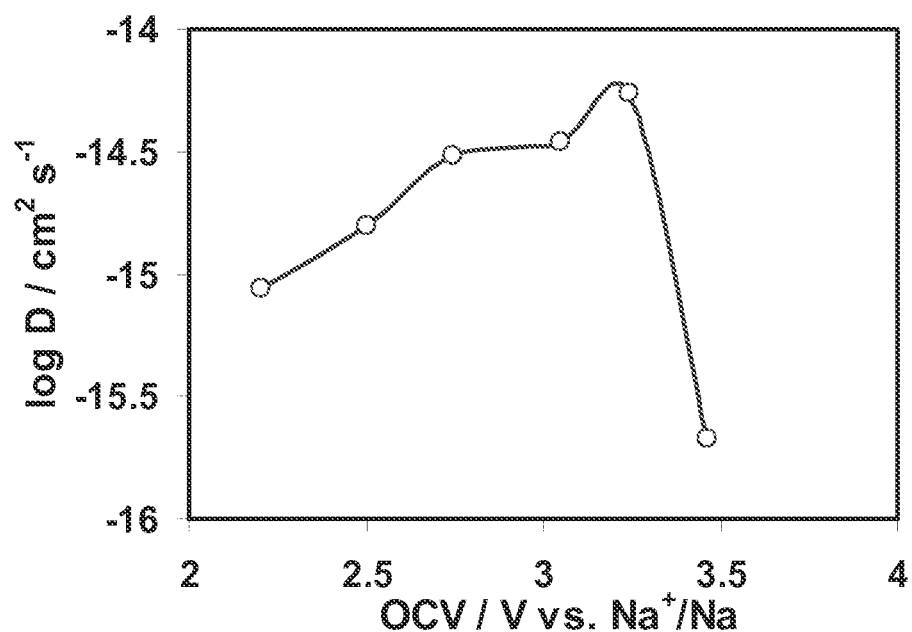

The importance of the ion diffusion in the nanowire structure is further demonstrated by the following calculation. Na-ion diffusion coefficient ($D_{Na}$) is determined from the low frequency Warburg contribution of the electrochemical impedance spectroscopy (EIS). The equation for $D_{Na}$ based on EIS response can be written as[13]

$$D_{Na^+} = 1/2\left[\left(\frac{V_m}{FSA_w}\right)\frac{dE}{dx}\right] \quad (1)$$

Where $V_m$ is the molar volume of $Na_4Mn_9O_{18}$ (22.85 cm$^3$ mol$^{-1}$), F is the Faraday constant (96,486 C mol$^{-1}$), S is the contact area between electrolyte and electrode material (taken as the BET surface area, 17.8 m$^2$ g$^{-1}$, for first approximation for $Na_4Mn_9O_{18}$ nanowires). $A_W$ is the Warburg coefficient, which was determined as the average value of the slope of Z' and –Z" vs. $\omega^{-1/2}$ plots (w is the angular frequency), respectively. (dE/dx) is the differential of the galvanostatic titration curve. The diffusion coefficients of sodium ion for different open circuit voltage (OCV) values were summarized in FIG. 5B and FIG. 7. As can be seen, $D_{Na}$ for $Na_4Mn_9O_{18}$ nanowires is in the voltage range of 2.4-3.5 V is 8.67×10$^{-16}$–3.04×10$^{-15}$ cm$^2$ s$^{-1}$. Based on the average $D_{Na}$ value (~3×10$^{-15}$) and the equation for the diffusion time ($r^2/D_{Na}$), we estimate the diffusion time for Na$^+$ to diffuse over 25 nm (average radius of $Na_4Mn_9O_{18}$ nanowires) to be 0.57 h. Hence, the $Na_4Mn_9O_{18}$ nanowire electrode does not present severe polarization for up to 2 C rate. However, in the bulk material, the discharge capacity should decrease dramatically over 2 C rate because of Na ion diffusion limitation. At a high charge/discharge current density of over 2 C (5 C and 10 C), a drastic decrease of the discharge capacity is expected, as confirmed by experimental observations, 56 mA h g$^{-1}$ at 5 C and 26 mA h g$^{-1}$ at 10 C respectively, as shown in FIG. 5A. This result clearly confirms that the rate limiting process in the electrode material is the Na ion diffusion, and highly crystalline, smaller nanowires could further improve the electrochemical performance.

Figure 10A:
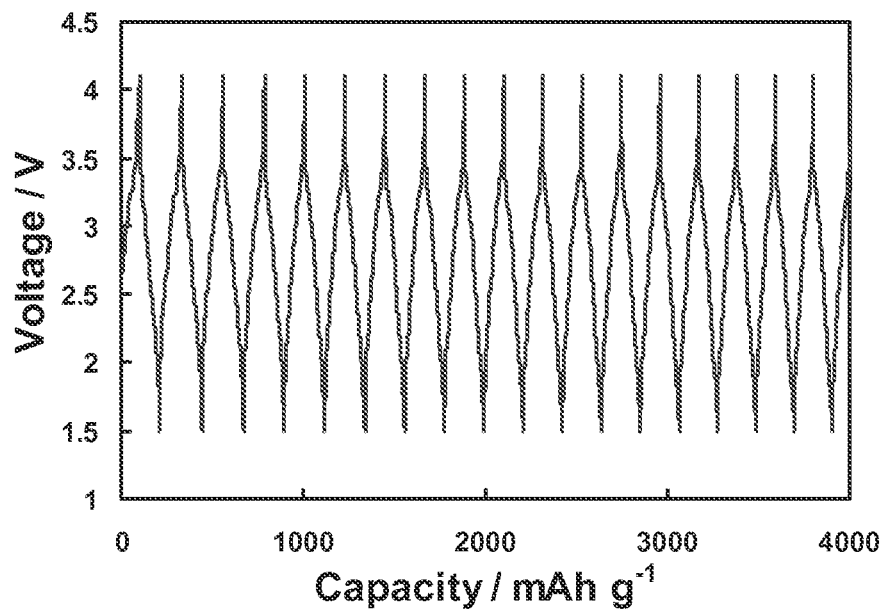
FIG. 10 shows (A) charge-discharge performance of the $Na_4Mn_9O_{18/pyrolyzed}$ carbon sodium-ion battery in the potential range of 1.5~4.1 V (vs Na/Na$^+$) at a constant current of 50 mA g$^{-1}$ (~0.5 C); and (B) cycle performance of the $Na_4Mn_9O_{18/pyrolyzed}$ carbon sodium-ion battery after 100 cycles.
Figure 10B:
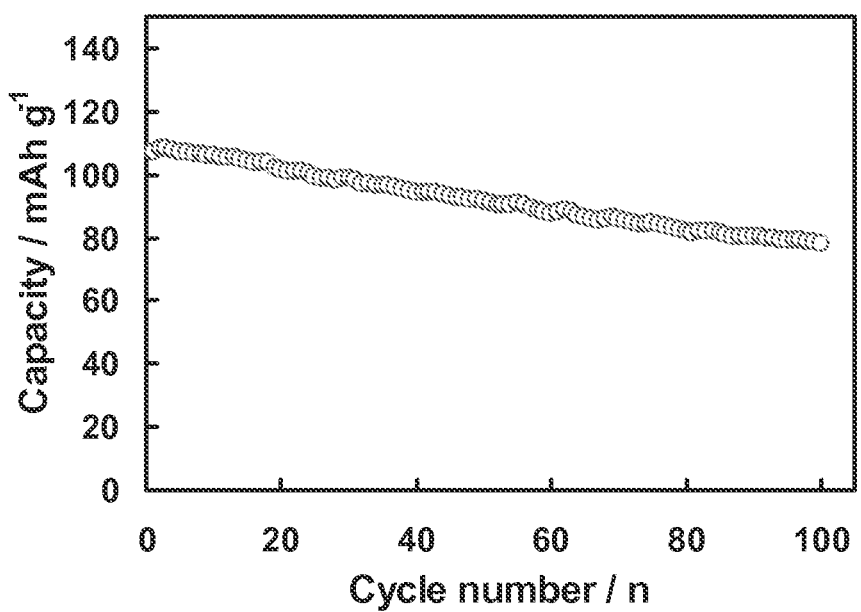

We also investigated the performance of the sodium-ion full cell based on the as-prepared $Na_4Mn_9O_{18}$ nanowires as cathode and pyrolyzed carbon as anode. The charge-discharge profiles for full cell were tested in the potential range of 1.5~4.1 V (vs Na/Na$^+$) at a constant current of 50 mA g$^{-1}$ (~0.5 C, based on the active mass of $Na_4Mn_9O_{18}$ cathode), shown in FIG. 10A. FIG. 10A shows a slope charge-discharge curve, an average discharge voltage of 2.7V and reversible cycling performance. The $Na_4Mn_9O_{18}$/pyrolyzed carbon sodium-ion battery can deliver 73% capacity retention after 100 cycles, as shown in FIG. 10B. This result suggests that the sodium-ion battery could be a viable and low-cost potential alternative for an energy storage system.

Figure 6A:
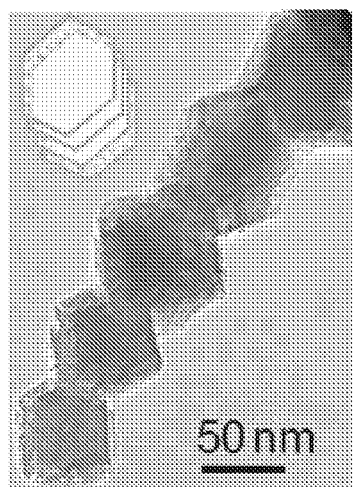
FIG. 6 shows (A,B) TEM images of $Na_{0.9}Li_{0.25}Mn_{0.75}O_2$; (C) cycle performance of the different cathode samples at a current density of 60 mA g$^{-1}$ (0.5 C).
Figure 6B:
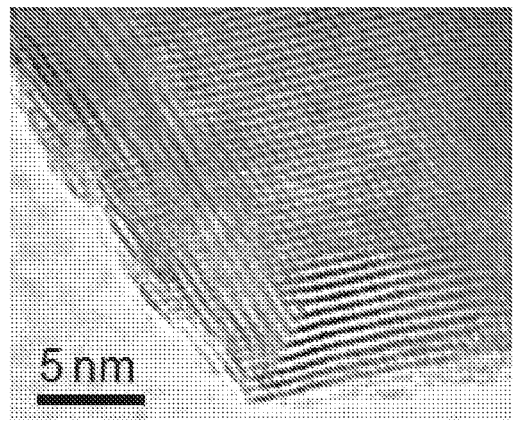
Figure 6C:
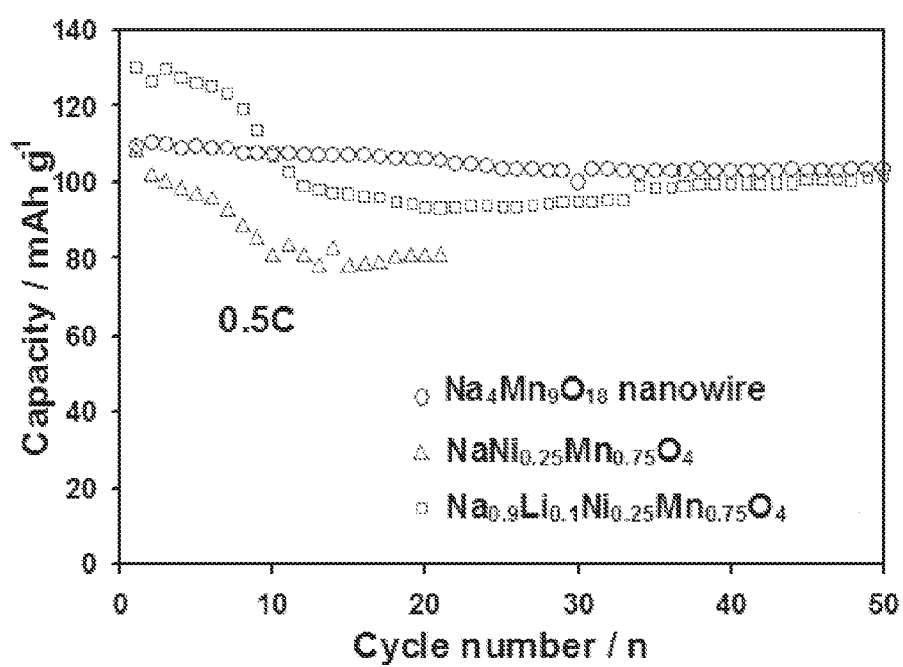

$Na_4Mn_9O_{18}$ belongs to a large family of open structured $MnO_2$ structure. The structures and properties of this family of materials can be systematically varied by the rich chemistry and synthesis conditions. Great opportunities exist not only in terms of tuning the intrinsic properties but also in controlling the nanostructures. Using the same polymer-pyrolysis synthetic method, we demonstrated that we can prepare nanostructured, layered oxide materials ($Na_xLi_yNi_{0.25}Mn_{0.75}O_4$, x=1.0 and 0.9, x+y=1), as illustrated in FIG. 6A and FIG. 6B. As compared to pure $Na_4Mn_9O_{18}$, this material has an even higher initial discharge capacity, i.e., 130 mA h g$^{-1}$ (60 mA/g, at 0.5 C), but the initial stability is not as good as $Na_4Mn_9O_{18}$, as shown in FIG. 6C. It is interesting that the capacity fading occurs only at first 10 cycles, as detailed in FIG. 6C, possibly corresponding to the initial structural conversion. The $Na_{0.9}Li_{0.1}Ni_{0.25}Mn_{0.75}O_4$ electrode can still deliver a reversible capacity of 101 mA h g$^{-1}$ after 50 cycles, but the performance of the same material without Li doping is poor.

The detailed Na-ion insertion/extraction mechanism and the possible multiphase transition in the nanostructured $MnO_2$ family materials deserve great in-depth study in the future. The Na-ion diffusion in these materials is actually comparable to the Li-ion diffusion in LiFePO$_4$ materials (10$^{-15}$-10$^{-17}$ cm$^2$ s$^{-1}$). Therefore, the strategies used to improve the LiFePO4 rate performance could shine light on the further enhancement of the rate performance of $Na_4Mn_9O_{18}$ nanowires through methods such as carbon coating, doping and optimization in particle size.

In summary, we prepared, in one embodiment, single crystalline $Na_4Mn_9O_{18}$ nanowires by a polymer-pyrolysis method using polyacrylates of Na and Mn as precursor compounds. The optimized $Na_4Mn_9O_{18}$ have high crystallinity and homogeneous nanowire structure, which provide stable structure and shorten the diffusion path for sodium ion intercalation/deintercalation reaction. The $Na_4Mn_9O_{18}$ nanowires have shown a high reversible capacity (128 mA h g$^{-1}$ at 0.1 C), excellent cycleability (82% capacity retention for 500 cycles at 0.5 C) and promising rate capability for a sodium ion battery. The outstanding performance of the $Na_4Mn_9O_{18}$ nanowires makes itself a promising candidate to construct a viable and low-cost Na-ion batteries system for upcoming power and energy storage systems.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A sodium-ion insertion device in which energy is stored comprising:
   a crystalline nanowire containing polyacrylates of sodium and manganese, wherein the device has an electrode capacity of at least 80 mAh/g; the device has an energy density of at least 800 kWh/kg; the device exhibits less than about 30% degradation after about 100 to about 2000 charge/discharge cycles; and wherein the device includes a single crystalline nanowire with a diameter of less than about 70 nm.

2. The sodium-ion insertion device of claim 1 wherein the device is a sodium-ion battery or a sodium-ion capacitor.

* * * * *